US011856019B2

(12) United States Patent
Alberstein

(10) Patent No.: US 11,856,019 B2
(45) Date of Patent: Dec. 26, 2023

(54) METHODS AND SYSTEMS FOR INJECTION DETECTION TO SECURE AGAINST AN INJECTION ATTACK

(71) Applicant: Verizon Patent and Licensing Inc., Basking Ridge, NJ (US)

(72) Inventor: Alexander Alberstein, Clifton, VA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 315 days.

(21) Appl. No.: 17/181,308

(22) Filed: Feb. 22, 2021

(65) Prior Publication Data

US 2022/0272121 A1 Aug. 25, 2022

(51) Int. Cl.
*H04L 9/40* (2022.01)
*G06F 40/289* (2020.01)
*G06F 16/245* (2019.01)

(52) U.S. Cl.
CPC ........ *H04L 63/1466* (2013.01); *G06F 16/245* (2019.01); *G06F 40/289* (2020.01); *H04L 63/1416* (2013.01); *H04L 63/1433* (2013.01)

(58) Field of Classification Search
CPC ...... G06F 40/289; G06F 16/245; G06F 21/51; H04L 63/1416; H04L 63/1433; H04L 63/1466
See application file for complete search history.

(56) References Cited

U.S. PATENT DOCUMENTS

| | | | | |
|---|---|---|---|---|
| 2006/0212438 | A1* | 9/2006 | Ng | G06F 16/24534 |
| 2008/0147627 | A1* | 6/2008 | Natkovich | G06F 16/2454 |
| | | | | 707/E17.05 |
| 2009/0150374 | A1* | 6/2009 | Dewey | G06F 21/562 |
| | | | | 707/999.005 |
| 2009/0328217 | A1* | 12/2009 | Markovich | G06F 21/6227 |
| | | | | 726/22 |
| 2012/0284237 | A1* | 11/2012 | Li | G06F 16/24526 |
| | | | | 707/E17.014 |
| 2014/0156696 | A1* | 6/2014 | Goel | G06F 16/2428 |
| | | | | 707/769 |
| 2014/0283096 | A1* | 9/2014 | Neerumalla | G06F 21/52 |
| | | | | 726/26 |
| 2017/0237762 | A1* | 8/2017 | Ogawa | G06F 16/13 |
| | | | | 726/23 |
| 2018/0084007 | A1* | 3/2018 | Dinerstein | H04L 63/1466 |
| 2020/0186548 | A1* | 6/2020 | Alagar | H04L 67/02 |

* cited by examiner

*Primary Examiner* — Daniel B Potratz
*Assistant Examiner* — Matthias Habtegeorgis

(57) ABSTRACT

An illustrative injection detection system receives a text statement that includes a set of text elements and implements instructions for performing an operation with respect to a data structure. The system identifies a target risk element count equal to a number of risk elements preapproved to occur within the set of text elements of the text statement. The system also determines a detected risk element count equal to a number of risk elements that occur within the set of text elements of the text statement. If the system detects a violation of a predetermined rule defining an acceptable relationship between the target and detected risk element counts for the text statement, the system triggers an exception condition indicating a risk that the text statement corresponds to an injection attack on the data structure. Corresponding methods and systems are also disclosed.

20 Claims, 8 Drawing Sheets

```
402
String query = "SELECT * FROM appUsers WHERE userID = <value1>
               OR username = '<value2>' AND userType = 'admin';"
```
Fig. 4A
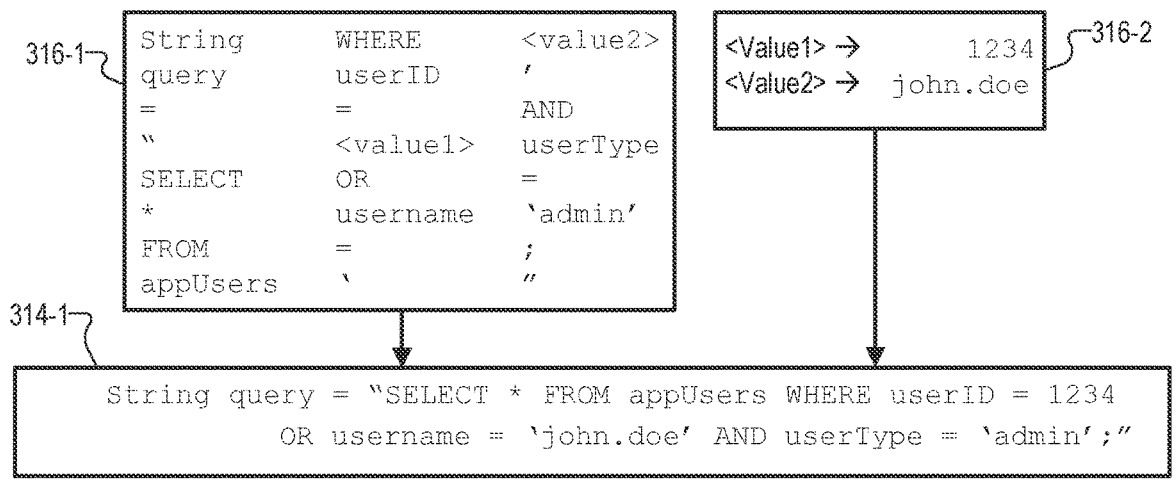
Fig. 4B
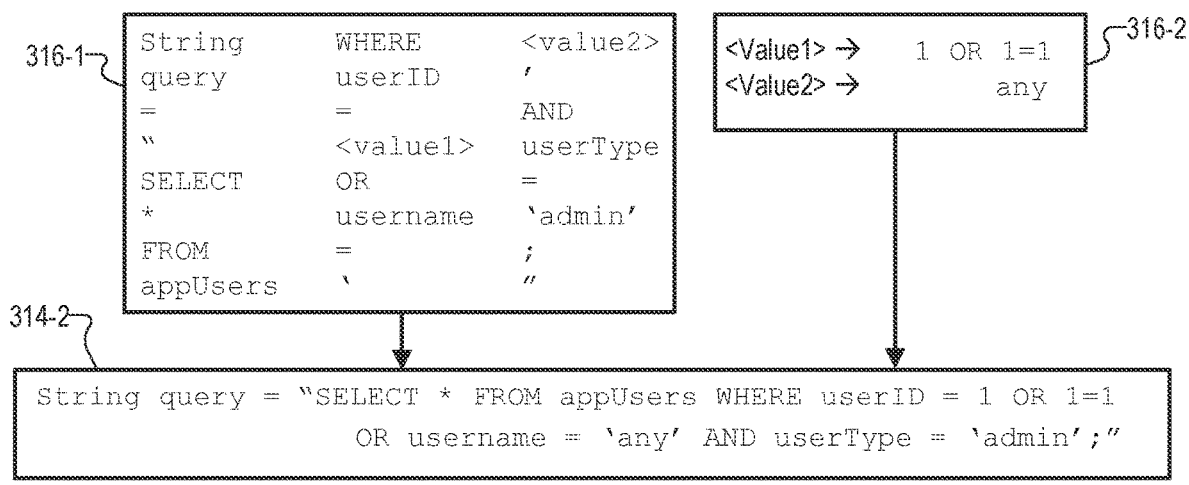
Fig. 4C

METHODS AND SYSTEMS FOR INJECTION DETECTION TO SECURE AGAINST AN INJECTION ATTACK

BACKGROUND INFORMATION

Data structures of various types are crucial to systems and networks enabling modern computing and communications technologies. For example, databases are a common type of data structure that may be used to organize, store, maintain, and otherwise manage data for various types of computing and communications applications. Other types of data structures may include specific types of databases (e.g., code bases, etc.), data stores other than databases (e.g., data lakes, data marts, data warehouses, etc.), data held in memory (e.g., instruction stacks containing executable program code such as of a web application or other executable program, etc.), and/or other collections of data that may be stored, structured, and managed in a variety of ways.

Because of the important role data structures play in modern computing and communications infrastructures, data structures are commonly targeted by malefactors (e.g., computer hackers, etc.) who use various types of attacks to try to gain illicit access to data structures for a variety of illegal and/or illegitimate goals (e.g., to destroy or otherwise compromise the data structures, to obtain user passwords and/or other valuable or private data, to steal money, to illegally expose secrets, etc.). One particularly pervasive type of attack commonly attempted against data structures is called an injection attack. In an injection attack, an attacker may use a legitimate input request (e.g., a text field, etc.) to inject illegitimate data (e.g., instructions or code configured to create an effect unintended by the original developer of the input request).

BRIEF DESCRIPTION OF THE DRAWINGS

The accompanying drawings illustrate various implementations and are a part of the specification. The illustrated implementations are merely examples and do not limit the scope of the disclosure. Throughout the drawings, identical or similar reference numbers designate identical or similar elements.

FIG. 4A shows an illustrative incomplete text statement drafted by a developer in accordance with principles described herein.

FIG. 4B shows a first completed version of the text statement of FIG. 4A generated based on a first subset of text elements provided by a data client in accordance with principles described herein.

FIG. 4C shows a second completed version of the text statement of FIG. 4A generated based on a second subset of text elements provided by a data client in accordance with principles described herein.

DETAILED DESCRIPTION OF EXAMPLE EMBODIMENTS

Figure 1:
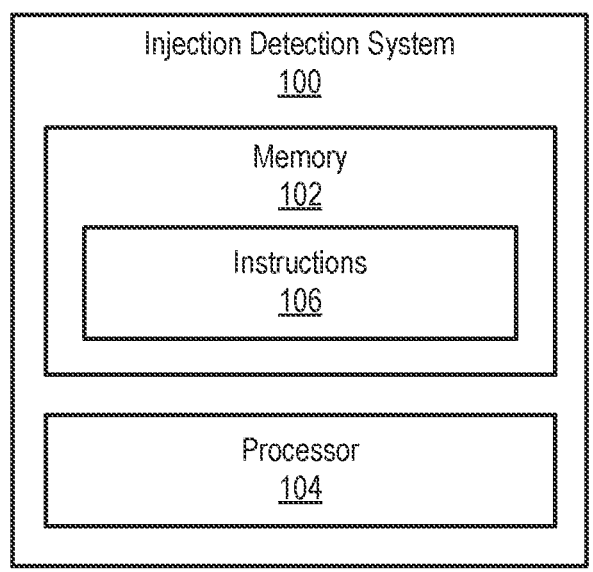
FIG. 1 shows an illustrative injection detection system configured to secure against an injection attack in accordance with principles described herein.

Methods and systems for injection detection to secure against an injection attack are described herein. As used herein, an injection attack on a data structure may refer to any attempt to infiltrate or compromise the data structure by injecting data into a text statement that implements one or more instructions configured to direct a processor to perform an operation with respect to the data structure. For example, as will be described in more detail below, an SQL injection attack may be attempted against a database (or other SQL-compliant data structure) that is managed by way of text statements implemented as SQL queries. In this example, one or more text elements inserted into a template statement of an SQL query (e.g., by way of a solicited text input) may be maliciously designed to cause the SQL query to perform a different operation with respect to the database than was originally intended by the developer of the SQL query template. Other examples of injection attacks may include Cross-Site Scripting ("XSS"), operating command injection, code injection (e.g., remote code execution), XML External Entity ("XXE") injection, and so forth. In certain cases, principles described herein may also be applied to help secure against other types of attacks such as buffer overflow attacks (e.g., a stack overflow attacks) and/or other types of attacks that may similarly be attempted to compromise program code in memory or another such data structure. In still other examples, other types of injections attacks may be attempted to infiltrate or compromise other types of data structures in similar ways.

Methods and systems described herein may be used for securing against any of these or other types of injection attacks (e.g., attacks on any of these or other types of data structures). However, for clarity and conciseness, the following disclosure will primarily focus on examples involving databases and text statements for managing databases (e.g., SQL queries, scripts, instructions, etc.) in particular.

SQL injection attacks are notoriously difficult to detect for various reasons. One challenge is that such injection attacks typically leave no trace because a compromised SQL query appears to a security analyzer as any other valid, well-formed query. Another challenge is that SQL queries that are to be executed on a database may have been created by a large number and variety of different developers, each of whom will have a different level of security awareness, different time and budget pressures they are working under, and so forth. Conventional approaches to securing SQL queries and other text statements have operated by examining individual text elements that are provided by (potentially malicious) data clients and inserted into (presumably non-malicious) template statements drafted by trusted developers. However, results of these conventional approaches tend to generate huge lists of hits that may be almost entirely false positives and must be verified in a manual process that can be extremely time-consuming and very prone to error itself.

In contrast to these conventional approaches, methods and systems described herein for injection detection to secure against an injection attack take a full statement analysis approach in which entire text statements (rather than individual text elements within the text statements) are analyzed, prior to execution with respect to the data structure, in light of predefined restrictions (e.g., defined automatically during development of the text statement, set manually by the developer of the text statement, etc.). Specifically, as will be described and illustrated in more detail below, each text statement may be associated with one or more lists of text elements such as a whitelist of text elements that are always to be allowed as is ("allowed elements"), a blacklist of text elements that are always to be prohibited ("prohibited elements"), and a restricted occurrence whitelist of text elements that are only allowed to occur in certain predefined numbers and/or in accordance with predetermined rules ("risk elements").

A restricted occurrence whitelist may function as a hybrid between a whitelist and a blacklist, and may serve to allow developers to use risk elements (e.g., keywords, instructions, etc.) as the developers see fit while restricting such elements from being maliciously embedded in text elements provided by untrusted data sources. For example, if a developer intends for a particular text statement to include five risk elements (or risk elements of a particular type such as "OR" risk elements, semicolon risk elements, etc.), injection detection systems described herein may ensure that exactly five (or another suitable relationship such as no more than five, no less than five, etc.) text elements are included in each complete text statement (e.g., each template statement into which one or more solicited text elements have been inserted from external data clients) that is received. If an acceptable number of risk elements are determined to be present (e.g., exactly five in the example above), the system may allow the text statement to be executed on the data structure. Otherwise, the system may secure against an injection attack by disallowing the text statement from being executed on the data structure and triggering an exception condition. For example, exception conditions may include errors, warnings, events, security violations, and so forth as appropriate for a particular implementation.

Additionally, for text elements that are not found on any of the lists mentioned above (e.g., text elements that are not defined as being allowed elements, prohibited elements, or risk elements), injection detection systems described herein may be configured to alter the unknown text elements within the text statements to neutralize the text elements or otherwise render harmless any threat the text elements may have posed. For example, as will be described in more detail below, injection detection systems described herein may identify unknown text elements included within a complete text statement that is otherwise considered to be secure (e.g., because it has no prohibited elements and any risk elements satisfy relevant predetermined rules), and may alter these unknown text elements to convert them from potentially malicious instructions into harmless identifiers (which, if malicious, would result in an error when executed rather than performing the malicious functionality). In this way, injection detection systems described herein may secure the statements by neutralizing any ability the unknown elements might have to do harm to the data structure.

Methods and systems described herein for injection detection to secure against an injection attack may provide a variety of technical benefits and advantages, as described and made apparent herein. For example, injection detection systems described herein may operate in a manner that limits malicious actors such as hackers from successfully embedding risk elements (e.g., keywords, instructions, code, etc.) into text statements that are executed on a data structure, while still allowing trusted developers to freely use any type of risk element they see fit to properly design their queries. Security methods described herein may also be implemented with zero (or very few) false positives, making these security methods far more efficient than conventional methods that require manual checks of scan lists including large numbers of false positives.

Another benefit found in certain implementations is that injection detection systems and methods described herein may be readily combined with other types of security systems and methods. For example, security systems and methods that leverage different approaches than those described herein (e.g., including conventional systems and methods) may continue to be used as additional lines of defense to bolster the security provided by injection detection systems described herein.

Moreover, all of these benefits may be provided without substantively compromising system performance or requiring significant additional work by developers. For example, processing time for full statement analysis of a text statement according to methods described herein may take approximately 10-50 milliseconds and may usually take less than 20 milliseconds. Additionally, it would generally take less than one minute for a developer to properly secure a text statement that may have taken, for instance, twenty minutes or more to draft.

Various specific implementations will now be described in detail with reference to the figures. It will be understood that the specific implementations described below are provided as non-limiting examples of how various novel and inventive principles may be applied in various situations. Additionally, it will be understood that other examples not explicitly described herein may also be captured by the scope of the claims set forth below. Methods and systems described herein for injection detection to secure against an injection attack may provide any of the benefits mentioned above, as well as various additional and/or alternative benefits that will be described and/or made apparent below.

FIG. 1 shows an illustrative injection detection system 100 ("system 100") configured to secure against an injection attack in accordance with principles described herein. System 100 may be implemented by computer resources such as processors, memory facilities, storage facilities, communication interfaces, and so forth. For example, system 100 may be implemented by computing systems such as data servers configured to provide storage services, application services (e.g., web applications, etc.), or the like. In some examples, system 100 may be implemented by resources of distributed computing systems operated by a communications provider (e.g., multi-access edge computing ("MEC") servers), distributed computing systems operated by a cloud-computing provider (e.g., multi-access cloud servers), or other suitable computing system or systems.

As shown, system 100 may include, without limitation, a memory 102 and a processor 104 selectively and communicatively coupled to one another. Memory 102 and processor 104 may each include or be implemented by computer hardware that is configured to store and/or execute computer software. Various other components of computer hardware and/or software not explicitly shown in FIG. 1 may also be included within system 100. In some examples, memory 102 and processor 104 may be distributed between multiple devices and/or multiple locations as may serve a particular implementation.

Memory 102 may store and/or otherwise maintain executable data used by processor 104 to perform any of the functionality described herein. For example, memory 102 may store instructions 106 that may be executed by processor 104. Memory 102 may be implemented by one or more memory or storage devices, including any memory or storage devices described herein, that are configured to store data in a transitory or non-transitory manner. Instructions 106 may be executed by processor 104 to cause system 100 to perform any of the functionality described herein. Instructions 106 may be implemented by any suitable application, software, script, code, and/or other executable data instance. Additionally, memory 102 may also maintain any other data accessed, managed, used, and/or transmitted by processor 104 in a particular implementation.

Processor 104 may be implemented by one or more computer processing devices, including general purpose processors (e.g., central processing units (CPUs), graphics processing units (GPUs), microprocessors, etc.), special purpose processors (e.g., application-specific integrated circuits (ASICs), field-programmable gate arrays (FPGAs), etc.), or the like. Using processor 104 (e.g., when processor 104 is directed to perform operations represented by instructions 106 stored in memory 102), system 100 may perform functions associated with injection detection to secure against an injection attack as described herein and/or as may serve a particular implementation.

Figure 2:
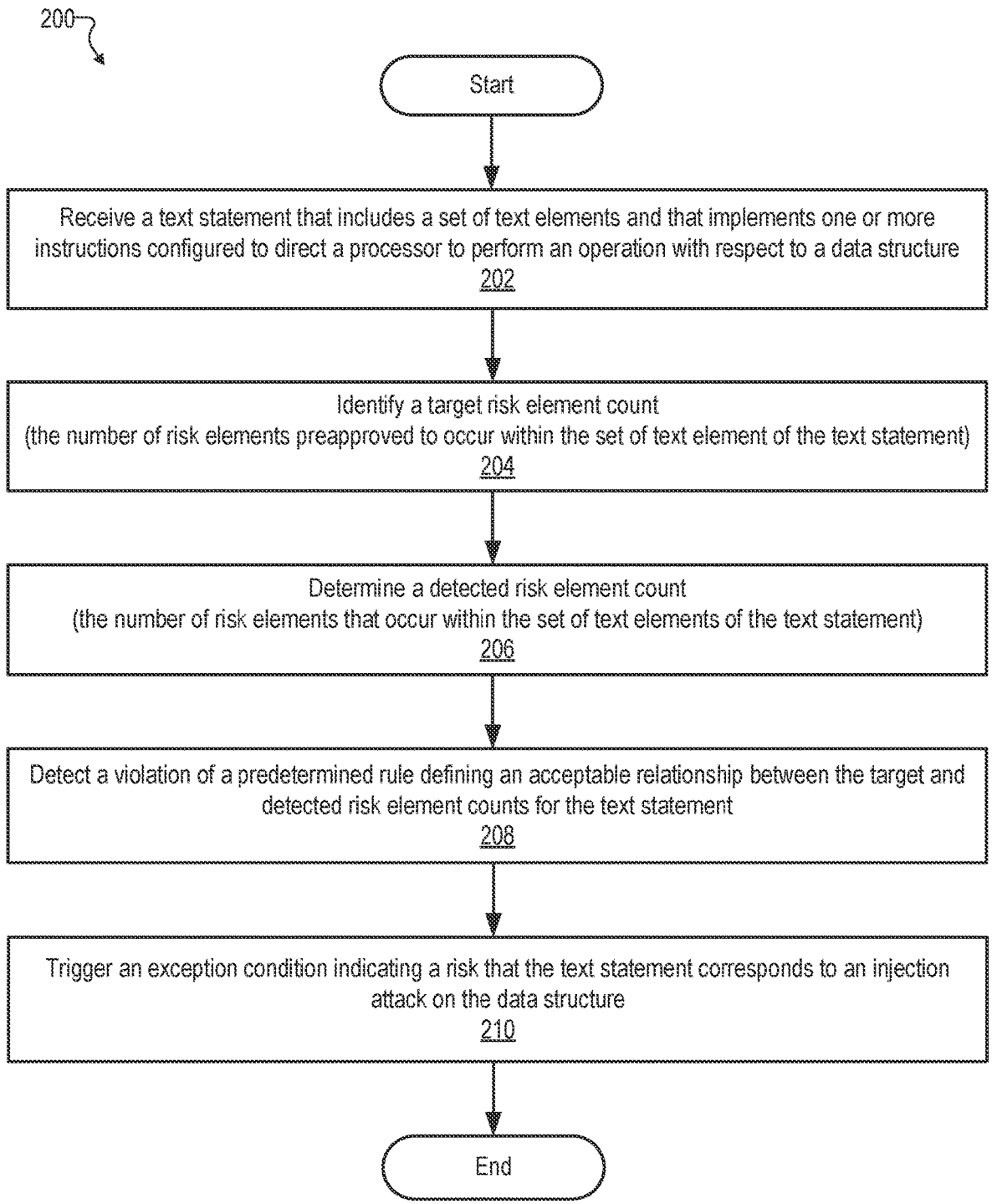
FIG. 2 shows an illustrative method for injection detection to secure against an injection attack in accordance with principles described herein.

As one example of functionality that processor 104 may perform, FIG. 2 shows an illustrative method 200 for injection detection to secure against an injection attack in accordance with principles described herein. While FIG. 2 shows illustrative operations according to one implementation, other implementations may omit, add to, reorder, and/or modify any of the operations shown in FIG. 2. In some examples, multiple operations shown in FIG. 2 or described in relation to FIG. 2 may be performed concurrently (e.g., in parallel) with one another, rather than being performed sequentially as illustrated and/or described. One or more of the operations shown in FIG. 2 may be performed by an injection detection system such as system 100 and/or any implementation thereof.

In some examples, the operations of FIG. 2 may be performed in real time so as to provide, receive, process, and/or use data described herein immediately as the data is generated, updated, changed, exchanged, or otherwise becomes available. Moreover, certain operations described herein may involve real-time data, real-time representations, real-time conditions, and/or other real-time circumstances. As used herein, "real time" will be understood to relate to data processing and/or other actions that are performed immediately, as well as conditions and/or circumstances that are accounted for as they exist in the moment when the processing or other actions are performed. For example, a real-time operation may refer to an operation that is performed immediately and without undue delay, even if it is not possible for there to be absolutely zero delay. Similarly, real-time data, real-time representations, real-time conditions, and so forth, will be understood to refer to data, representations, and conditions that relate to a present moment in time or a moment in time when decisions are being made and operations are being performed (e.g., even if after a short delay), such that the data, representations, conditions, and so forth are temporally relevant to the decisions being made and/or the operations being performed.

Each of operations 202-210 of method 200 will now be described in more detail as the operations may be performed by system 100 (e.g., by processor 104 as processor 104 executes instructions 106 stored in memory 102).

At operation 202, system 100 may receive a text statement implementing one or more instructions configured to direct a processor to perform an operation with respect to a data structure. The text statement may include (e.g., be formed from) a set of text elements that originate from two distinct sources. First, a template statement (also referred to as a "spec" or "incomplete text statement") may include text elements that provide a basic structure into which additional text data is to be inserted, as well as placeholder elements to indicate where the additional text data is to be inserted. This template statement may originate from a developer who is entrusted with securely interfacing with (i.e., not attacking) the data structure. Second, one or more text elements comprising the additional text data that is to be inserted into the template may originate from one or more data clients that may not necessarily be trusted to securely interface with the data structure (i.e., that may attempt to attack the data structure). As will be described in more detail below, the text statement (also referred to herein as a "complete text statement") may be generated by populating the template statement provided by the developer with the solicited text elements provided by one or more data clients in accordance with the placeholder elements left in the template statement.

The one or more instructions implemented by the text statement (e.g., after the text statement is completed by populating the client elements into the template statement) may execute with respect to the data structure (e.g., to write data to the structure, read data from the structure, change data within the structure, etc.), may be used as configuration criteria for the data structure (e.g., setting or updating a configuration setting or parameter, etc.), or may otherwise perform any suitable operation with respect to the data structure.

The text statement may be implemented as a script, query, set of instructions, or any other type of text statement as may serve a particular implementation, and, as such, may include any number or type of text elements within the set of text elements. For example, in an implementation in which the data structure is an SQL-compliant database, the text statement may be a text string implementing an SQL query to be executed on the database, and the text elements may be different sub-groupings of text characters within the string that are delimited by one or more particular characters (e.g., space characters, certain punctuation characters, etc.). In accordance with a predetermined standard or programming language (e.g., SQL in this example), certain text elements within the set of text elements may be recognized as having a predefined meaning or function. For instance, certain keyword elements (e.g., "OR," "DROP," "UNION," "INTERSECT," "EXECUTE," etc.) may have a particular meaning or trigger a particular function when used in an SQL statement, certain punctuation elements (e.g., semicolons, slashes, etc.) may cause the text statement to be interpreted in a particular way (e.g., indicating the beginning or end of a new instruction, indicating the start of a comment that is not to be executed, etc.), and so forth. Other text elements within the set of text elements (e.g., input strings, identifiers such as variable names, etc.) may have meaning or function only in context with particular instructions rather than having intrinsic and predefined meaning like that of the keywords and punctuation described above. Examples of text statements including various types of text elements will be described in more detail below.

At operation 204, system 100 may identify a target risk element count that is equal to a number of risk elements preapproved (e.g., by the developer) to occur within the set of text elements of the text statement. For example, as described in more detail below, a developer may "preapprove" a target risk element count based on how many such elements the developer chooses to use in a template statement, based on a manual selection by the developer, or in any other way described herein. As used herein, risk elements are text elements that are included on a restricted occurrence whitelist accessed by system 100 and considered, for a particular implementation, to increase a risk of a security threat (e.g., vulnerability to an injection attack) if not suitably monitored and/or restricted. For instance, in one implementation, various intrinsically meaningful keywords and punctuation associated with a language (e.g., the keywords and punctuation described above with respect to the SQL example) may be designated as risk elements, while other text elements that do not have any such intrinsic meaning (e.g., variable names, string literals, comments, etc.) may not be considered risk elements. In certain examples, as will be described in more detail below, operation 204 may involve identifying individual target counts for different types of risk elements (e.g., a first target count of "OR" text elements, a second target count of semicolon (";") text elements, etc.) instead of or in addition to a total target count of all the types of risk elements present.

The target risk element count identified at operation 204 may be defined during a programming phase (at design time, rather than at runtime) and may be set manually by a trusted developer or automatically as overseen by the developer. The target risk element count may be defined as the number of occurrences of risk elements that are included within the template statement or that are expected or otherwise approved to be included within the complete text statement after the template statement is populated. For example, if the developer includes N risk elements among the text elements forming the template statement and the developer does not intend for any risk elements to be inserted into the placeholders by the additional text elements that are to populate the template statement, the target risk element count may be identified to be N risk elements. System 100 may identify the target risk element count in any suitable way. For example, as will be described in more detail below, the target risk element count may be stored and accessed by system 100, may be included in metadata associated with the text statement, or may otherwise be accessed and identified as may serve a particular implementation.

At operation 206, system 100 may determine a detected risk element count equal to a number of risk elements that occur within the set of text elements of the text statement. Thus, whereas the target risk element count may represent an expected or approved number of risk elements to be included in the set of text elements making up the text statement, the detected risk element count may represent a number of risk elements that are determined to actually occur in the set of text elements (a number which may or may not be the same as the number indicated by the identified target risk element count). The determining of the detected risk element count may be performed in any suitable way. For instance, system 100 may determine the count based on a restricted occurrence whitelist that defines, for a particular implementation or a particular text statement, which text elements are to be considered risk elements.

Based on such a list, system 100 may parse each individual text element from others within the set and count how many of the total text elements are risk elements. As will be described in more detail below, in certain examples, different detected risk element counts may be determined at operation 206 for each individual type of risk element (e.g., a detected count for "OR" risk elements, another detected count for semicolon risk elements, etc.).

At operation 208, system 100 may detect a violation of a predetermined rule defining an acceptable relationship (e.g., a relationship that is acceptable in the sense that it would not trigger a violation of the rule) between the target risk element count (identified at operation 204) and the detected risk element count for the text statement (determined at operation 206). The predetermined rule may be created during the programming phase (e.g., at design time together with the template statement) with input from the trusted developer and may define what relationships are and are not to be considered acceptable for the target and detected risk element counts. For instance, the predetermined rule may indicate that the only acceptable (e.g., valid, allowable, etc.) relationship between the target and detected risk element counts is for the counts to be equal. Thus, in this example, if the counts are not precisely the same, system 100 would detect at operation 208 that the predetermined rule is violated. In other examples, the predetermined rule may indicate that the detected risk element count must be less than or equal to the target risk element count, greater than or equal to the target risk element count, within a range around the risk element count, or any other suitable relationship as may serve a particular implementation. Examples of predetermined rules defining acceptable relationships between the target and detected risk element counts will be provided below.

The predetermined rule may be associated with the text statement in any suitable manner. For instance, a generalized predetermined rule may be defined and stored on an enterprise level and referenced by all data storage gateways and/or interfaces to be applied to all text statements. As another example, a more customized predetermined rule may be designated within metadata connected to the text statement by a developer of the text statement. Additionally, the developer may define, by way of the target risk element count, how many total risk elements he or she intends for there to be within the text statement (or, in certain examples, how many risk elements are intended of each risk element type, such as how many "ORs", how many semicolons (";"), etc.). The predetermined rule may then indicate exactly what relationship is allowed between the actual count of risk elements and the target count if an exception condition is to be avoided. System 100 may obtain the predetermined rule and use it to compare the target and detected risk element counts determined at operations 204 and 206 to thereby determine if the text statement, as a whole, includes an unacceptable (e.g., high-risk or unexpected) number of risk elements.

At operation 210, system 100 may trigger an exception condition based on the detecting at operation 208 of the violation of the predetermined rule. For example, in some implementations or under certain circumstances, the triggering may interrupt program flow to throw an error, warning, or other exception. In other implementations and/or under other circumstances, the triggering may flag, mark, tag, or otherwise provide an indication that the text statement has been determined to pose a risk without interrupting program flow. For instance, upon validating and/or evaluating text statements in the ways described herein, system 100 may include associated flags or notifications with the statements as appropriate such that client systems may decide how to handle the statements (e.g., throw an exception, log an error and quietly exit, etc.).

Accordingly, the exception condition triggered at operation 210 may be an error condition, a warning condition, an event or notification condition, a warning or flag associated with the text statement, or another suitable exception condition configured to indicate a risk that the text statement corresponds to an injection attack on the data structure. In some examples, the triggering of the exception condition may ultimately lead to the prevention of the text statement being executed on the data structure. In this way, the risk of injection attack on the data structure may be mitigated.

It will be understood that if system 100 does not detect a violation of the predetermined rule (e.g., in the event that the target risk element count identified at operation 204 and the detected risk element count determined at operation 206 are equal or have another acceptable relationship), operations 208 and 210 would not be performed. Instead, system 100 may detect that the predetermined rule is complied with and, as such, may direct the text statement to execute on the data structure as described herein without triggering any exception condition.

Figure 3:
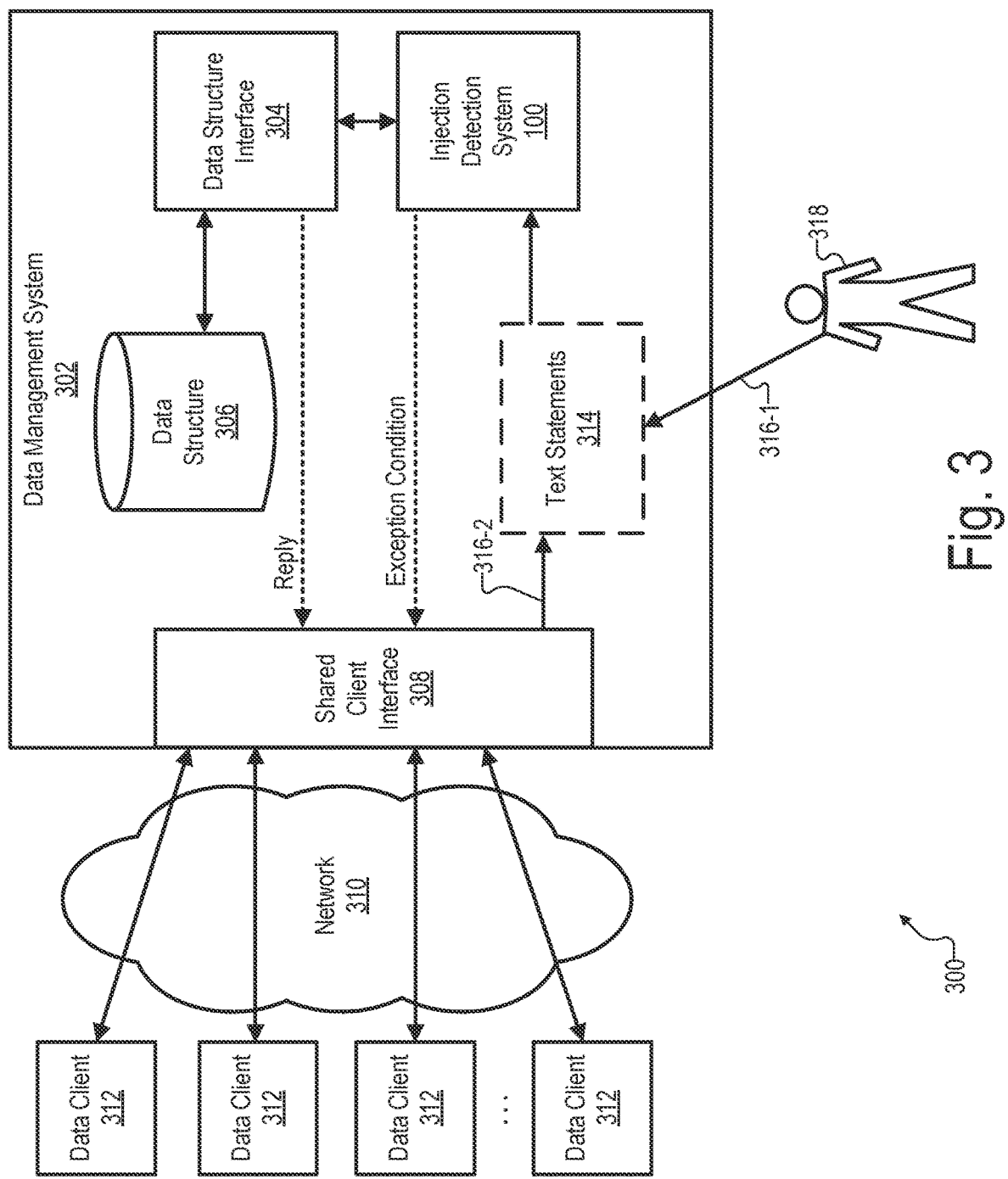
FIG. 3 shows an illustrative configuration in which an injection detection system may operate in accordance with principles described herein.

FIG. 3 shows an illustrative configuration 300 in which an injection detection system such as system 100 may operate. Specifically, as shown, system 100 may be implemented within a data management system 302 that includes a data structure interface 304 that is in communication with system 100 and with a data structure 306. Data management system 302 also includes a shared client interface 308 configured to receive data by way of a network 310 from a plurality of different data clients 312. System 100 is shown to receive text statements 314 that are formed from various text elements 316 including certain text elements 316-1 (also referred to as template elements 316-1 or template statement 316-1) provided by a developer 318 and other text elements 316-2 (also referred to as insertion elements 316-2) that are received from data clients 312 (by way of network 310 and shared client interface 308). As has been described, insertion elements 316-2 may be merged with template elements 316-1 to form completed text statements 314 to be analyzed by system 100. Each of the elements of configuration 300 will now be described in more detail.

Data management system 302, as shown, may be a server-side system communicatively coupled to data clients 312 by way of network 310. For example, data management system 302 may be implemented as one or more storage servers, application servers, or the like that enable data management for various web sites, mobile applications, enterprise applications, distributed computing services (e.g., cloud storage services, etc.), and so forth. In some examples, data management system 302 may be implemented as an individual server computer that includes a processor, a memory, a communication interface, a storage facility, and other resources implementing the components shown to be included within data management system 302 in FIG. 3. In other examples, data management system 302 may represent a combination of functions implemented on a plurality of different server computers or other devices that are communicatively coupled and configured to interoperate to perform the functions of data management system 302 described herein.

Data structure interface 304 may represent a data management unit included within data management system 302 that performs functionality associated with executing text statements 314 on data structure 306 and/or otherwise interfacing with data structure 306. In performing this function, data structure interface 304 may receive instruction from system 100 that indicates which instructions and text statements are to be executed, which statements trigger an exception condition (and therefore should not be executed in certain implementations), and the like. In certain implementations, system 100 may pass text statements 314 to data structure interface 304 for execution on data structure 306, so any text statements 314 that pose an unacceptable risk may be filtered by system 100 itself (i.e., not provided to data structure interface 304 for execution). In these examples, data structure interface 304 may execute every text statement 314 received from system 100. In other implementations, text statements 314 may all be provided directly to data structure interface 304 and information received from system 100 may indicate which of the text statements 314 can be safely executed and which should be discarded and not executed due to a risk these text statements pose of an injection attack.

As shown by a dotted arrow output from data structure interface 304, a reply received by data structure interface 304 from data structure 306 (e.g., indicating the success or failure of a particular operation executed on data structure 306, etc.) may be provided, by data structure interface 304 and by way of shared client interface 308 and network 310, to whichever data client 312 requested the particular operation. Conversely, as shown by another dotted arrow output from system 100, an exception condition triggered by system 100 for any of the reasons described herein may be provided, by system and by way of shared client interface 308 and network 310, to whichever data client 312 provided the text statement 314 that triggered the exception condition.

Data structure 306 may be implemented by any of the types of data structures described herein, including various types of databases (e.g., code bases, etc.), other data stores (e.g., data lakes, data marts, data warehouses, etc.), data being executed (e.g., instruction stacks containing executable program code such as of a web application or other executable program, etc.), and so forth. In certain implementations, data structure 306 may be implemented as an SQL-compliant database. In these implementations, data structure interface 304 may not be directed to perform any database operation with respect to data structure 306 (e.g., as directed by one or more instructions implemented by a particular SQL query implementing one of text statements 314) until system 100 performs a text statement analysis on the particular SQL query. In this way, data structure 306 may be protected (or further protected, in implementations that further include security systems other than system 100) from security threats such as injection attacks.

Shared client interface 308 may be configured to communicate (e.g., by way of network 310 or another suitable communication medium) with various distinct data clients 312 that are external to data management system 302. By way of shared client interface 308, data management system 302 may receive text statements (e.g., SQL queries, etc.) from data clients 312. In some examples, a plurality of SQL queries from distinct data clients 312 may include complete text statements in which data clients 312 have inserted custom text elements 316-2 into template statements 316-1 drafted by developer 318. Additionally or alternatively, the plurality of SQL queries from data clients 312 may be received as text elements 316-2 that are to be embedded by data management system 302 into incomplete text statements to thereby form complete text statements 314. For example, as shown in FIG. 3, text elements 316-1 provided by developer 318 may represent text elements forming an incomplete text statement (i.e., a template statement) and text elements 316-2 provided by shared client interface 308 from data clients 312 may represent solicited insertion elements used to fill in the placeholders and thereby form complete text statements 314 that are analyzed by system 100.

As mentioned above, it may be a difficult or even insurmountable challenge to analyze individual text elements reliably and efficiently (e.g., without false positives or false negatives) when those text elements are provided by a large number of distinct data clients 312 which data management system 302 has no reason to trust and over which data management system 302 has no control. For example, there may be thousands of developers and/or users associated with thousands of data clients 312, such that data management system 302 receives millions of text statements (e.g., SQL queries) containing millions of text elements. Any analysis of individual text elements will therefore be prone to human error and inefficiency because each element has different characteristics and requirements. Accordingly, by enabling a centralized protection mechanism that collects all of the input data using shared client interface 308 and that then provides complete text statements 314 to be analyzed by system 100, the conventional challenges of analyzing individual text elements are avoided. As will be described in more detail below, it is noted that this centralized protection approach with respect to analyzing full and complete text statements may operate alone or in conjunction with other security approaches that require analyzing and/or securing individual text elements in a decentralized manner.

Network 310 may include elements of a provider-specific wired or wireless communications network (e.g., a cellular network used for mobile phone and data communications, a 5G network or network of another suitable technology generation, a cable or satellite carrier network, a mobile telephone network, etc.) operated and/or managed by a provider entity such as a mobile network operator (e.g., a wireless service provider, a wireless carrier, a cellular company, etc.). Additionally or alternatively, network 310 may include elements of various interconnected networks that are outside of any provider network and outside the control of any provider of such a provider network. Elements of the Internet, a wide area network, a content delivery network, and/or any other suitable network or networks are examples of other elements that may be included within network 310. Any of these provider or non-provider networks or network elements may provide data delivery between data management system 302 (e.g., shared client interface 308) and data clients 312.

Data clients 312 may represent a variety of external systems that provide text statements (e.g., either as complete text statements 314 or as individual text elements 316-2 that are inserted into template statements 316-1 to build complete text statements 314) for execution by data management system 302. In some examples, data clients 312 may be implemented by user equipment devices such as mobile devices (e.g., smartphones, tablet devices, etc.), personal computer devices, or other such devices that are used by users to access and provide input to web, mobile, and/or enterprise applications and other processes managed by data management system 302. In other examples, data clients 312 may be implemented by other suitable systems that may include any applications, data stores, or other elements that collect and/or exchange data in any suitable way. Regardless of their implementation, each data client 312 may be external to, and outside the control of, data management system 302 such that data received from data clients 312 may be considered untrusted and in need of analysis prior to exposing the data to sensitive and valuable data stored within data structure 306.

Text statements 314 represent textual strings implementing one or more instructions configured to direct a processor (e.g., a processor associated with data structure interface 304) to perform one or more operations with respect to data structure 306. As has been mentioned, text statements 314 may be implemented as SQL queries in certain examples (e.g., in examples in which data structure 306 is an SQL-compliant database and the SQL queries include instructions for database operations to be performed on the database). In other implementations, text statements 314 may be associated with Javascript or other programming languages or data processing conventions used to gather textual data input from web forms, text fields, search engine inputs, and so forth.

Text statements 314 may include (e.g., may be composed from) a set of text elements 316 that originate from different sources. For example, as shown in FIG. 3, template text elements 316-1 may originate from code drafted by a trusted developer 318. These text elements 316-1 may include risk elements (e.g., keywords, etc.) and it is desirable that these risk elements be allowed through system 100 to execute on data structure 306. Template statements formed from text elements 316-1 (with placeholders where text elements 316-2 are to be inserted) are referred to herein as incomplete text statements.

As further shown in FIG. 3, insertion elements labeled as text elements 316-2 are shown to originate from data clients 312 (e.g., by way of network 310 and shared client interface 308). These text elements 316-2 may also include risk elements, but, because data clients 312 are outside of the purview of data management system 302 and hence do not necessarily merit trust, it may not be desirable for text statements including these risk elements (referred to herein as complete text statements after text elements 316-2 fill in the placeholders of the incomplete text statements) to be allowed through system 100 to execute on data structure 306. For example, these risk elements may cause text statements 314 to form malicious instructions of an injection attack that a person associated with one of data clients 312 is attempting to perpetrate on data structure 306.

To illustrate an example of how safe and unsafe text statements 314 may be formed prior to being analyzed by system 100, FIG. 4A shows an illustrative incomplete text statement 402 (also referred to as template statement 402). For example, incomplete text statement 402 may be drafted by developer 318 and may include a set of text elements 316-1, including various risk elements, together with various placeholders for solicited input that will be received as text elements 316-2. Specifically, placeholders labeled "<value1>" and "<value2>" in incomplete text statement 402 represent the placeholders where text elements 316-2 are to be inserted, while the remainder of the text elements of incomplete text statement 402 may represent text elements 316-1.

FIG. 4B shows a first complete text statement 314-1 generated based on incomplete text statement 402 (i.e., text elements 316-1) and based on a first subset of text elements 316-2 provided by a data client 312. Specifically, as shown, "1234" replaces the "<value1>" placeholder, "john.doe" replaces the "<value2>" placeholder, and complete text statement 314-1 becomes a safe text statement that comports with what developer 318 intended (e.g., since "1234" is a valid userID and "john.doe" is a valid username).

In contrast, FIG. 4C shows a second complete text statement 314-2 generated based on incomplete text statement 402 (i.e., text elements 316-1) and based on a second subset of text elements 316-2 provided by a data client 312 (e.g., a data client 312 that may be different than the one providing text elements 316-2 of FIG. 4B and that may be associated with a user attempting to perpetrate an injection attack). Specifically, as shown, "1 OR 1=1" replaces the "<value1>" placeholder, "any" replaces the "<value2>" placeholder, and complete text statement 314-2 becomes an unsafe text statement that likely does not comport with what developer 318 intended (e.g., since "1 OR 1=1" is not a valid userID, "any" is not a valid username, and these values alter the nature of the operation that the text statement would execute on the data structure).

Text statement 314-1 may cause data structure 306 to return a user record for a user named "john.doe," which is what developer 318 likely intended when drafting incomplete text statement 402. However, because user input comes from an untrusted, Internet facing web page (e.g., one of data clients 312), it would be possible for a user with malicious intent to provide text elements 316-2 like those in FIG. 4C, rather than those in FIG. 4B. If these text elements 316-2 are inserted so as to generate text statement 314-2, this text statement may cause data structure 306 to return all records of admin users, which is unlikely to be what developer 318 intended when drafting incomplete text statement 402 (and which may be an example of how data structure 306 could be attacked and compromised using an injection attack).

Accordingly, one function of system 100 as it analyzes each incoming text statement 314 is to differentiate neutral (safe) text statements like text statement 314-1 from malicious (unsafe) text statements like text statement 314-2. However, as has been mentioned, one challenge in making this distinction is that text statement 314-2 may not include any prohibited element that would not be allowed if included in the original incomplete text statement 402. Therefore, to successfully identify text statement 314 as being problematic, system 100 may access data representative of different types of text elements (e.g., those that are always allowed, those that are always prohibited, and those that are allowed with occurrence restrictions, etc.) and rules defining how those text elements are to be used within a particular text statement 314.

Figure 5:
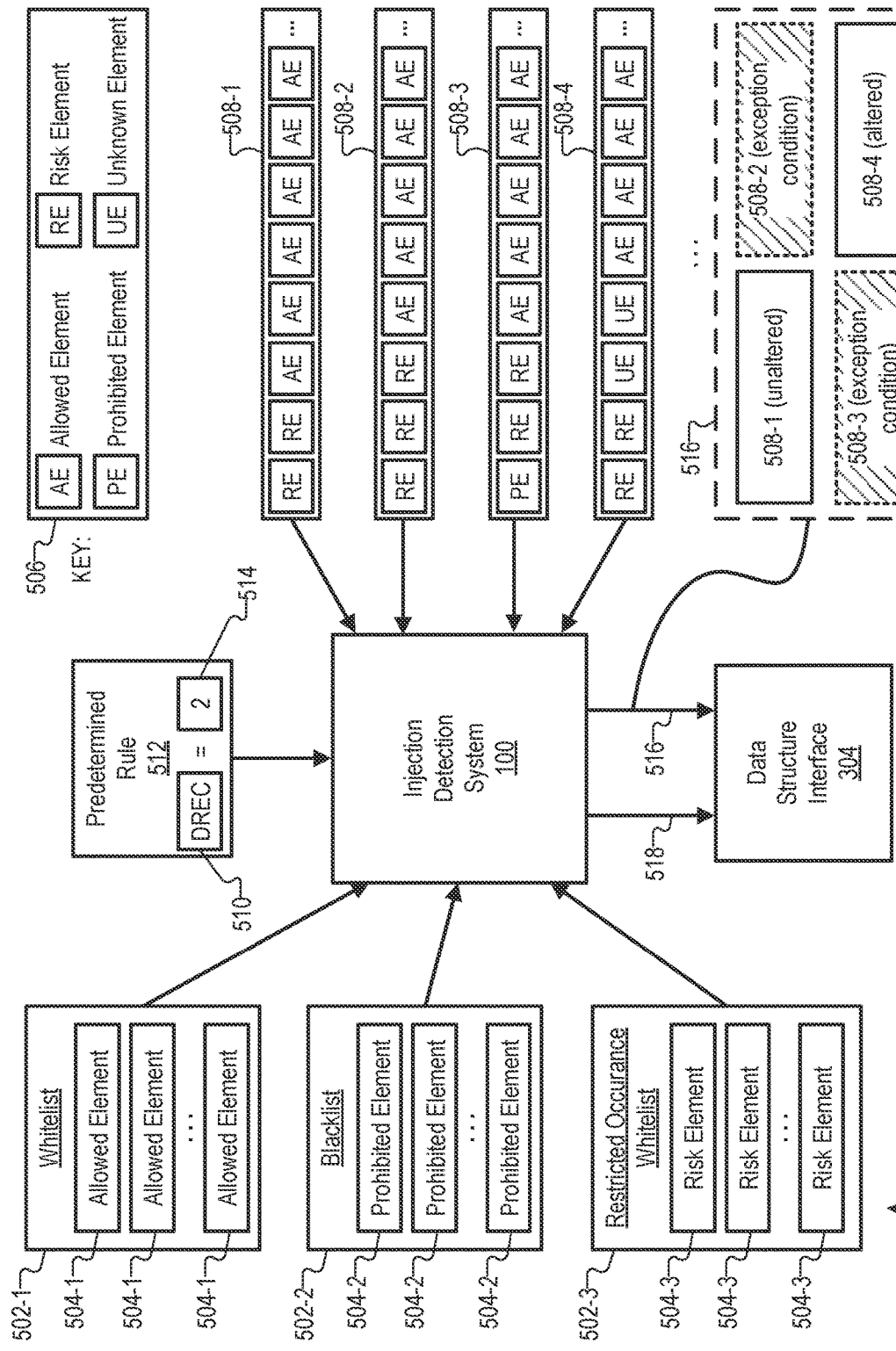
FIG. 5 shows various illustrative aspects of how an injection detection system secures text statements with different sets of text elements against injection attacks in accordance with principles described herein.

To illustrate, FIG. 5 shows various aspects of how an injection detection system such as system 100 may secure text statements having different sets of text elements against injection attacks. As described above in relation to operation 206, one aspect of securing a text statement against an injection attack is to determine a detected risk element count equal to a number of risk elements that occur within the set of text element of the text statement. FIG. 5 illustrates one way this determining of the detected risk element count may be performed. Specifically, as shown, system 100 may access various lists 502 (e.g., lists 502-1 through 502-3) of different types of text elements 504 (e.g., text elements 504-1 through 504-3) that are to be treated in different ways. For example, as shown in the corner with an arrow, developer 318 may draft, provide, control, oversee automated creation of, or otherwise manage these lists to ensure that the lists accurately reflect how particular text statements are to be analyzed.

Developer 318 may manage, and system 100 may access, any lists of text elements as may serve a particular implementation. As one example, system 100 may access a whitelist 502-1 of text elements 504-1 that, if included within the set of text elements of a text statement being analyzed, are to be counted as allowed elements. Text elements 504-1 are therefore labeled as "Allowed Elements" within whitelist 502-1 and are abbreviated as "AE" elsewhere in FIG. 5, as indicated by key 506. As another example, system 100 may access a blacklist 502-2 of text elements 504-2 that, if included within the set of text elements of the text statement being analyzed, are to be counted as prohibited elements. Text elements 504-2 are therefore labeled as "Prohibited Elements" within blacklist 502-2 and are abbreviated as "PE" elsewhere in FIG. 5, as indicated by key 506.

As yet another example, system 100 may access a restricted occurrence whitelist 502-3 of text elements 504-3 that, if included within the set of text elements of the text statement being analyzed, are to be counted as risk elements. Text elements 504-3 are therefore labeled as "Risk Elements" within restricted occurrence whitelist 502-3 and are abbreviated as "RE" elsewhere in FIG. 5, as indicated by key 506. System 100 may determine the detected risk element count referred to above in operation 204 of FIG. 2 to be the number of text elements within the text statement being analyzed that are found on this restricted occurrence whitelist 502-3. In this way, restricted occurrence whitelist 502-3 may serve to prescribe, for a particular text statement, how many occurrences of risk elements (or of particular types of risk elements) are acceptable without triggering an exception condition (e.g., without identifying a risk of injection attack) in the ways described herein.

Key 506 indicates how different types of text elements 504 are represented within a plurality of illustrative text statements 508 (e.g., text statements 508-1 through 508-4) that are provided as examples in FIG. 5 of text statements that are analyzed and secured by system 100.

As shown in key 506 (and as mentioned above), allowed elements are represented using the abbreviation "AE". In one SQL based example, for instance, such allowed elements could include text elements that are considered to be identifiers (e.g., by being enclosed within double quotes, square brackets, etc.), text elements that are considered to be a string input or date value (e.g., by being enclosed in single quotes, etc.), numeric values, text elements that begin with an "@" symbol so as to be interpreted as placeholders or variables, or the like.

As further shown in key 506 (and as mentioned above), prohibited elements are represented using the abbreviation "PE". In the SQL-based implementation of the example above, such prohibited elements could include keyword text elements that are unlikely to be used by developer 318 and could pose a risk if executed on the data structure. For instance, prohibited elements may include keywords or identifiers such as "SYS," "INFORMATION_SCHEMA," "SYSOBJECTS," "TABLES," "VIEWS," "PACKAGES," "GRANT," or the like. In certain implementations, it may be possible for developer 318 to make use of these keywords if necessary. However, one or more special steps (e.g., calling a particular function, etc.) may be required to indicate to system 100 that these typically prohibited elements are intentionally to be allowed for a particular text statement.

As further shown in key 506 (and as mentioned above), risk elements are represented using the abbreviation "RE". In the SQL-based implementation of the example above, such risk elements could include keyword text elements that are likely to be used by developer 318 but that could still pose a risk if allowed to be executed on the data structure (e.g., in cases where such elements are provided by an untrusted data source and are configured to take malicious action on the data structure). Risk elements may include, for example, keywords and elements such as "OR," "AND," "UNION," "INTERSECT," "EXEC," "EXECUTE," "DROP," semicolons, comments (or punctuation used to begin or terminate a comment), or the like. These elements are to be allowed if they are part of the template statement (e.g., incomplete text statement 402) but may be restricted (e.g., prohibited, allowed but flagged with an exception condition, etc.) if they originate from an untrusted source (e.g., user input such as text elements 316-2) or otherwise fail to comport with applicable predetermined rules. This filtering operation (i.e., treating certain risk elements as allowed elements while treating others as prohibited or otherwise restricted elements) may be performed by system 100 in any suitable way, including as described below.

As further shown in key 506, there may also be certain text elements, referred to as unknown elements, that are not included on any of lists 502. Such unknown elements are represented using the abbreviation "UE" in FIG. 5 and may include any text elements that are not recognized as being prohibited, allowed, or allowed with restriction on occurrence (as risk elements). Unknown elements may include identifiers (e.g., names of the tables, views, columns, etc.) that serve as a vital part of a text statement to direct operations to be performed as intended by a developer. It may not be practical or feasible to whitelist all such identifiers (e.g., due to the large number of possible identifiers and fact that the list would be in constant flux due to changes in identifiers, due to degradation in performance, etc.). However, it also would not be necessary or desirable to prohibit an entire text statement as a result of an unknown element being found within the statement, even though it could be possible that an unknown element is present as part of some sort of injection attack. Accordingly, system 100 may be configured to explicitly delimit identifiers to ensure that they are processed as such (e.g., thereby allowing intended objects to be referenced while preventing unintended and/or unknown content from being executed). In this way, unknown elements that may pose a risk are neutralized to ensure that they lack any ability to direct the processor of data structure interface 304 to perform unauthorized operations on data structure 306.

Accordingly, rather than simply allowing or prohibiting text statements that include unknown elements, system 100 may allow a modified version of the text statement in which all unknown elements are altered so as to be explicitly delimited as identifiers (e.g., by placing square brackets or double quotes around the unknown elements within the text statement, etc.). Hence, even if an unknown element is part of a malicious attempt to compromise the data structure, the unknown element is neutralized so as to not have any ability to direct undesirable operations to be executed on the data structure.

Each of the example text statements 508 will now be described to illustrate various scenarios that system 100 may face and how these scenarios may be handled.

First, text statement 508-1 will be considered. As with other text statements described herein, text statement 508-1 may be received by system 100 and may implement one or more instructions configured to direct a processor (e.g., of data structure interface 304) to perform one or more operations with respect to the data structure. To this end, text statement 508-1 may include a set of text elements such as shown in FIG. 5 (i.e., two risk elements ("RE"), and various allowed elements ("AE"), some of which will be understood to be represented by an ellipsis).

In this example, system 100 may determine that the set of text elements of text statement 508-1 includes text elements that are indicated on whitelist 502-1 (e.g., all of the allowed elements), and may provide text statement 508-1 to data structure interface 304 for performing the one or more operations with respect to the data structure as set forth by the text elements included within text statement 508-1. In particular, based on the determining that the set of text elements includes the allowed elements indicated on whitelist 502-1, system 100 may provide text statement 508-1 to the processor of data structure interface 304 by providing these allowed text elements in an unaltered form (i.e., "as is" or as they are set forth in text statement 508-1).

Along with including the allowed elements from whitelist 502-1, another reason that text statement 508-1 may be provided in the unaltered form is that a detected risk element count 510 ("DREC") of text statement 508-1 (which is 2 in this example due to the occurrence of two risk elements ("RE") shown in text statement 508-1) does not violate a predetermined rule 512 that defines the only acceptable relationship between detected risk element count 510 and a target risk element count 514 is to be equal. For example, as shown by the '=' character, predetermined rule 512 is configured in this example to be violated if detected risk element count 510 and target risk element count 514 are unequal (and to comport with the rule if the counts are equal). As it happens in this example, target risk element count 514 is shown to have been identified as 2 in this example (a value that will be understood to have been set by developer 318 at design time). As such, the detected risk element count 510 of text statement 508-1 is equal to the target risk element count (i.e., both equal 2) such that text statement 508-1 is considered by system 100 to be safe to provide to data structure interface 304 in the unaltered form.

In contrast, text statement 508-2 will now be considered, which includes a set of text elements having three risk elements and various allowed elements (some of which will again be understood to be represented by an ellipsis). Again, in this example, system 100 may determine that the set of text elements of text statement 508-2 includes text elements that are indicated on whitelist 502-1. However, based on a determination that detected risk element count 510 for text statement 508-2 (which is 3 in this example) does not equal target risk element count 514 (which is 2) and therefore violates predetermined rule 512, system 100 may restrict text statement 508-2 from being provided to the processor of data structure interface 304 for performing operations directed by text statement 508-2 with respect to data structure 306. For example, this restricting may include abstaining from providing text statement 508-2 to the processor for execution on the data structure, providing the text statement with a warning or error condition to bring it to the attention of an operator or cause the operations to be performed in a restricted way, or otherwise handling text statement 508-2 in a manner that is more restricted than, for instance, the manner in which text statement 508-1 was handled. Based on predetermined rule 512 requiring equality between detected risk element count 510 and target risk element count 514, as well as the value identified for target risk element count 514 as 2, system 100 may essentially operate under an assumption that exactly two risk elements are expected for text statement 508-2 (e.g., because these two risk elements were explicitly included by developer 318) and that any more or fewer risk elements would have the potential to be part of an attempted injection attack. Restricting text statement 508-2 in these ways may hence help secure against such an injection attack.

Text statement 508-3 is shown to include a set of text elements having one prohibited element ("PE"), along with two risk elements and various allowed elements similar to text statement 508-1. In this example, system 100 may determine that the set of text elements of text statement 508-3 includes allowed elements that are indicated on whitelist 502-1, as well as an acceptable detected risk element count 510 of 2 that comports with (does not violate) predetermined rule 512 and identified target risk element count 514. However, along with these allowed elements and acceptable number of risk elements, system 100 may also determine that the set of text elements of text statement 508-3 includes the prohibited element that is indicated on blacklist 502-2. As a result, based on the determining that the set of text elements includes the prohibited element indicated on blacklist 502-2, system 100 may restrict text statement 508-3 from being provided to the processor of data structure interface 304 for performing operations directed by text statement 508-3 with respect to data structure 306 (e.g., by abstaining from providing text statement 508-3 to the processor for execution on the data structure, etc.).

Similar to text statement 508-3, text statement 508-4 is shown to include two risk elements (i.e., the acceptable count based on predetermined rule 512 and target risk element count 514) and various allowed elements. However, along with these elements, text statement is also shown to include two unknown elements ("UE"). Accordingly, in this example, system 100 may determine that the set of text elements of text statement 508-4 includes the unknown elements that are not indicated on any of lists 502, and may provide text statement 508-4 to the processor of data structure interface 304 for performing one or more operations set forth in the text statement with respect to the data structure. However, based on the determining that the set of text elements includes the unknown elements not indicated on lists 502, system 100 may provide text statement 508-4 to the processor in an altered form in which the unknown elements are secured (e.g., by converting the unknown elements into allowed keywords or other known elements, by converting the unknown elements into non-executable content such as by delimiting the unknown elements as identifiers, etc.) to neutralize the unknown elements in case they are associated with an injection attack attempt.

For example, if an attacker manages to inject a keyword such as "DELETE" into text statement 508-4 (and this keyword is not included on blacklist 502-2 or restricted occurrence whitelist 502-3), the altered version of text statement 508-4 may include brackets, quotes, or other added content around the term to neutralize the unknown element (e.g., reciting the element as "[DELETE]") so as to cause it to be interpreted by a database engine (e.g., data structure interface 304) as a name of a database object (e.g., rather than as a command keyword). As a result, an error will occur in this example that will prevent the high-risk query of text statement 508-4 from being executed on the data structure.

As shown in FIG. 5, a data transfer 516 from system 100 to data structure interface 304 represents certain data that is provided by system 100 to data structure interface 304 for execution on the data structure (not shown in FIG. 5). Consistent with the description above, a breakout of data transfer 516 is shown in FIG. 5 that illustrates that text statement 508-1 is provided in the unaltered form and text statement 508-4 is provided in the altered form. Moreover, as indicated by dotted lines and shading, text statements 508-2 and 508-3 are provided in a restricted form (e.g., provided with exception conditions and/or other restrictions if they are even provided to data structure interface 304 at all, which they may not be in certain implementations). Another data transfer 518 is also illustrated in FIG. 5 to be provided from system 100 to data structure interface 304 that may represent data corresponding to the text statements 508 that are provided. For example, data transfer 518 may include data representative of exception conditions, restrictions, metadata, and so forth.

As has been described, system 100 may determine whether to provide (e.g., include within data transfer 516 to data structure interface 304) a text statement 508 (e.g., text statement 508-1) or to restrict a text statement 508 (e.g., text statement 508-2) based at least in part on predetermined rule 512 and an associated target risk element count 514, which may be associated with the text statement and may be set by a developer such as developer 318.

Predetermined rule 512 may be set in a variety of different ways and may associated with different types of target risk element counts 514 (e.g., values, ranges of values, etc.) suitable for different types of conditions as a particular implementation may warrant (e.g., as developer 318 may define). For instance, in the examples of FIG. 5 described above, text statement 508-1 (which system 100 provided) and text statement 508-2 (which system 100 restricted) were described as being associated with a predetermined rule 512 that defined the only acceptable relationship between detected risk element count 510 and target risk element count 514 as being equal (i.e., such that the rule would be violated if these counts were unequal). This type of predetermined rule may be common particularly for text statements implemented as SQL queries. However, it will be understood that predetermined rule 512 may be configurable to be various types of rules besides the example equality rule described above. For instance, predetermined rule 512 could define the acceptable relationship to be detected risk element count 510 being less than (or less than or equal to) target risk element count 514, detected risk element count 510 being greater than (or greater than or equal to) target risk element count 514, detected risk element count 510 being less unequal to target risk element count 514, detected risk element count 510 being within a certain range around target risk element count 514, or any other suitable relationship as may serve a particular implementation.

In certain examples, system 100 may determine a total detected risk element count and compare that (e.g., based on a predetermined rule) to a total target risk element count as has been described in relation to FIG. 5. In other implementations, however, system 100 may be configured to operate in a more nuanced manner by, for example, identifying individual target risk element counts and corresponding predetermined rules for a variety of different types of risk elements (e.g., "OR" keywords, "AND" keywords, semicolons, comments, etc.), and determining the detected risk element count for each type of risk element as an individual typed count of risk elements for each particular type. For example, system 100 may determine a detected count of "OR" keywords that is to be compared using an "OR" rule against an "OR" target count, a detected count of "AND" keywords that is to be compared using and "AND" rule against an "AND" target count, and so forth. As such, in these examples, system 100 may detect whether the detected risk element count violates the predetermined rule by detecting whether each typed count of risk elements of each particular type has the acceptable relationship to the corresponding target risk element count for risk elements of that particular type. As one example, for instance, predetermined rule 512 may be associated with text statements 508 and may define the only acceptable relationship between counts 510 and 514 to be exact equality. The detected risk element count in this example would therefore be determined to violate predetermined rule 512 when detected risk element count 510 is different from (i.e., greater than or less than) target risk element count 514.

Figure 6:
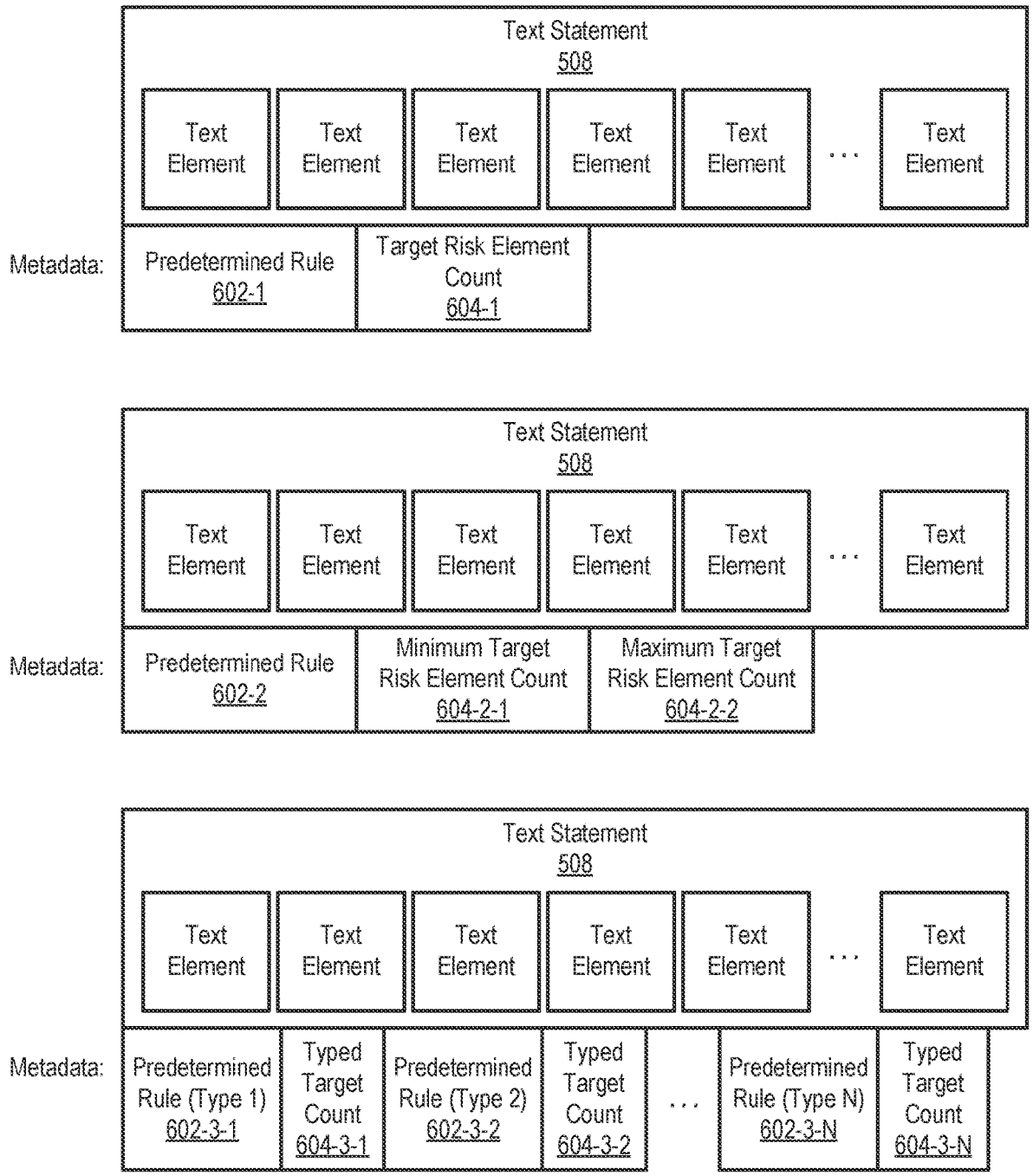
FIG. 6 shows several illustrative text statements that are associated with metadata implementing different types of predetermined risk thresholds in accordance with principles described herein.

To illustrate a few examples of how predetermined rule 512 and target risk element count 514 may be implemented, FIG. 6 shows several illustrative text statements 508 that each include a respective set of text elements (which could be any combination of allowed, prohibited, risk, or unknown text elements) and that are each associated with metadata implementing a different type of predetermined rules and corresponding target risk element counts. It will be understood that the predetermined rules shown in FIG. 6 (referred to collectively as predetermined rules 602) may be implementations of predetermined rule 512 described above, and that the target risk element counts shown in FIG. 6 (referred to collectively as target risk element counts 604) may be implementations of target risk element count 514 described above.

The first text statement 508 (at the top of FIG. 6) is shown to be associated with a predetermined rule 602-1 and a single target risk element count 604-1. As such, rule 602-1 may define an acceptable relationship for a detected risk element count to be equal to, unequal to, less than, less than or equal to, greater than, greater than or equal to, or within a range of target risk element count 604-1 (or any other suitable relationship), similar as described above for predetermined rule 512. In this example, any detected risk element count that does not have the defined relationship with target risk element count 604-1 (e.g., exact equality, etc.) may be considered to be part of a text statement that poses a threat of injection attack (and therefore should be restricted and trigger an exception condition as described for text statement 508-2 above). Conversely, any detected risk element count that has the defined relationship may be considered acceptable, such that the text statement may be passed through to data structure interface 304 (possibly in an altered form if there are unknown elements present) provided that there is not another issue found with the text statement (e.g., provided the text statement does not include a prohibited element, etc.).

The next text statement 508 (in the middle of FIG. 6) is shown to include a predetermined rule 602-2 that corresponds with a minimum target risk element count 604-2-1 and a maximum target risk element count 604-2-2 (collectively referred to as target risk element counts 604-2). Target risk element counts 604-2 may define a target range such that predetermined rule 602-2 may define the acceptable relationship as being within the target range (or, in certain examples, outside of the target range). Thus, in this example, any detected risk element count that falls outside of the target range (i.e., any count lower than minimum count 604-2-1 or greater than maximum count 604-2-2) may be considered to violate predetermined rule 602-2 and to be part of a text statement that poses a threat of injection attack (and therefore should be restricted and trigger an exception condition as described for text statement 508-2 above). Conversely, any risk element count that is within the target range (i.e., any count greater than or equal to minimum count 604-2-1 and lower than or equal to maximum count 604-2-2) may be considered acceptable, such that the text statement may be passed through to data structure interface 304 (possibly in an altered form if there are unknown elements present), provided that there are no other issues with the text statement.

The final text statement 508 (at the bottom of FIG. 6) is shown to be associated with a series of N predetermined rules 602-3 (e.g., predetermined rules 602-3-1 through 602-3-N) corresponding to respective typed target risk element counts 604-3 (e.g., typed target counts 604-3-1 through 604-3-N) associated with different types of risk elements that may be found in text statement 508. As described above, in this type of implementation, a typed detected count may be determined for each different type of risk element and this count must have a relationship with the relevant typed target count 604-3 as defined by the respective predetermined rule 602-3 in order to avoid violating the rule and the whole text statement being restricted and/or triggering the exception condition. In some examples, each predetermined rule 602-3 may be associated with a range (such as described above for predetermined rule 602-2) and typed target counts 604-3 may define minimum and maximum counts for each type of risk element.

While a few examples of predetermined rules and corresponding target risk element counts are described and illustrated herein, it will be understood that a developer may set up other types of predetermined rules and/or target risk element counts as may serve a particular implementation. Additionally, it will be understood that any suitable technique may be employed to determine what the predetermined rule and/or target risk element count should be for a given text statement 508. As one example, a developer may draft incomplete text statements and define a predetermined rule, then use system 100 to analyze and generate target risk element counts for each incomplete text statement in an automated way. For instance, system 100 may indicate and/or store a count of total risk elements (or several typed counts of different types of risk elements) that were found during the analysis and use these to automatically define a target risk element count for the incomplete text statement. In other examples, the developer may manually count and fill in target risk element count or use automatically generated counts to fill in the metadata (so as to avoid manually counting the risk elements since this could be inconvenient, inefficient, and prone to human error).

In some implementations, a full-statement analysis technique such as has been described herein may be employed together with one or more additional analysis techniques (e.g., text element analysis techniques, etc.). For example, one security analysis technique may be employed as a primary line of defense while another security analysis technique may be employed as a secondary line of defense.

Figure 7:
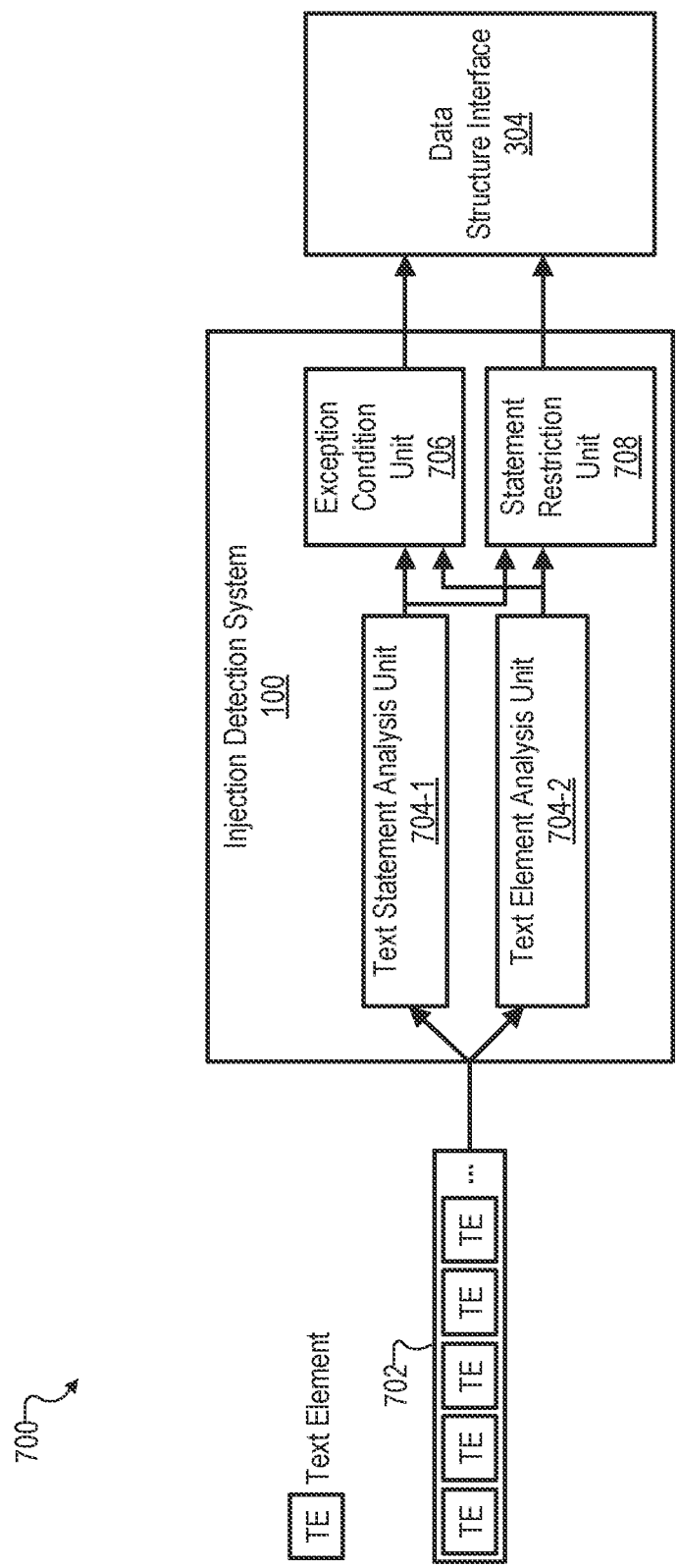
FIG. 7 shows an illustrative implementation of an injection detection system in accordance with principles described herein.

To illustrate, FIG. 7 shows an example implementation 700 of system 100 that inputs an illustrative text statement 702 including a set of text elements (each abbreviated "TE") and that performs a plurality of different security analyses (e.g., a text statement analysis and a text element analysis). Specifically, as shown, a text statement analysis unit 704-1 may be configured to perform a text statement analysis that includes various operations described herein such as operations 202 through 208 of method 200 (e.g., the receiving of the text statement, the determining of the count of risk elements, the determining that the count of risk elements exceeds the predetermined risk threshold, etc.).

In connection with the text statement analysis performed by text statement analysis unit 704-1 (e.g., in parallel or in series with the text statement analysis), a text element analysis unit 704-2 may perform a text element analysis that provides injection attack security based on risks identified from analyses of individual text elements (e.g., attempting to identify text elements that improperly attempt to inject code into text statement 702 to perpetrate an injection attack, etc.). As illustrated, both security analysis units 704 (i.e., units 704-1 and 704-2) may provide data to both an exception condition unit 706 that manages the triggering of exception conditions (e.g., managing data transfer 514 of FIG. 5) and a statement restriction unit 708 that manages whether text statement 702 is provided to data structure interface 304 and/or restricted in some way (e.g., managing data transfer 516 of FIG. 5). In this way, the triggering of the exception condition described at operation 208 of FIG. 2 may be based not only on the text statement analysis (e.g., the determining of operation 206 that the count exceeds the predetermined risk threshold), but also based on the text element analysis.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory (DRAM), which typically constitutes a main memory. Common forms of computer-readable media include, for example, a disk, hard disk, magnetic tape, any other magnetic medium, a compact disc read-only memory (CD-ROM), a digital video disc (DVD), any other optical medium, random access memory (RAM), programmable read-only memory (PROM), electrically erasable programmable read-only memory (EPROM), FLASH-EEPROM, any other memory chip or cartridge, or any other tangible medium from which a computer can read.

Figure 8:
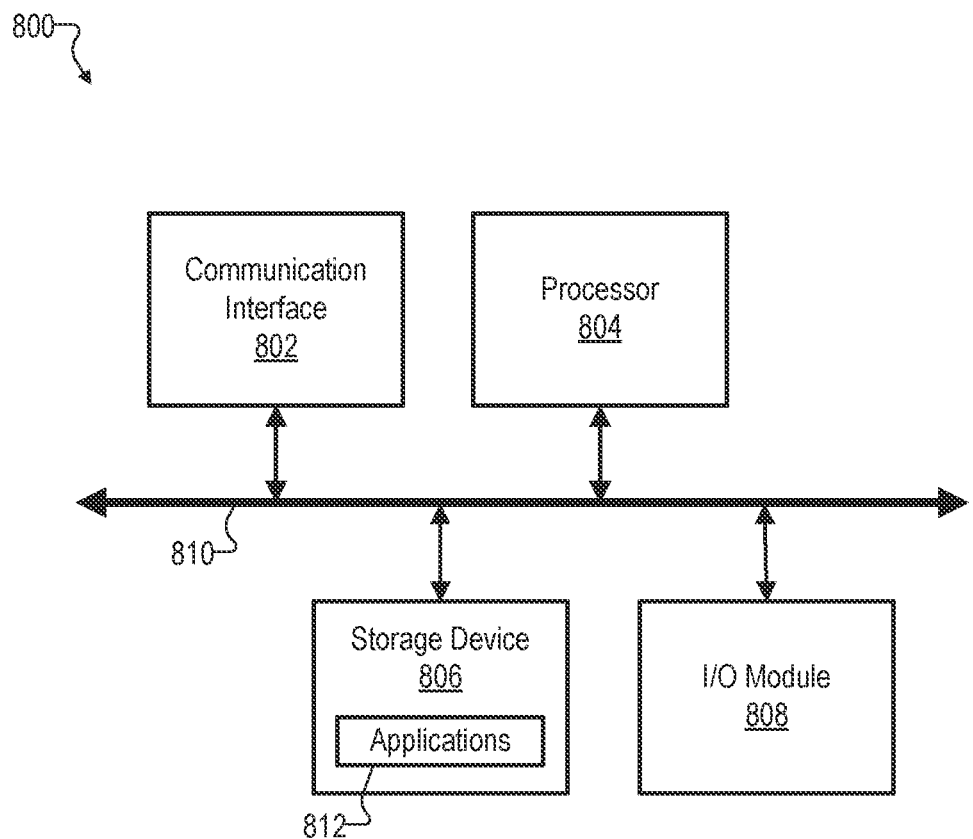
FIG. 8 shows an illustrative computing device that may implement injection detection systems and/or other systems and devices described herein in accordance with principles described herein.

FIG. 8 shows an illustrative computing device 800 that may implement injection detection systems and/or other systems and devices described herein in accordance with principles described herein. For example, computing device 800 may include or implement (or partially implement) an injection detection system such as system 100 or any component included therein or any system associated therewith (e.g., data management system 302, data structure interface 304, data structure 306, data clients 312, elements of network 310, etc.).

As shown in FIG. 8, computing device 800 may include a communication interface 802, a processor 804, a storage device 806, and an input/output (I/O) module 808 communicatively connected via a communication infrastructure 810. While an illustrative computing device 800 is shown in FIG. 8, the components illustrated in FIG. 8 are not intended to be limiting. Additional or alternative components may be used in other embodiments. Components of computing device 800 shown in FIG. 8 will now be described in additional detail.

Communication interface 802 may be configured to communicate with one or more computing devices. Examples of communication interface 802 include, without limitation, a wired network interface (such as a network interface card), a wireless network interface (such as a wireless network interface card), a modem, an audio/video connection, and any other suitable interface.

Processor 804 generally represents any type or form of processing unit capable of processing data or interpreting, executing, and/or directing execution of one or more of the instructions, processes, and/or operations described herein. Processor 804 may direct execution of operations in accordance with one or more applications 812 or other computer-executable instructions such as may be stored in storage device 806 or another computer-readable medium.

Storage device 806 may include one or more data storage media, devices, or configurations and may employ any type, form, and combination of data storage media and/or device. For example, storage device 806 may include, but is not limited to, a hard drive, network drive, flash drive, magnetic disc, optical disc, RAM, dynamic RAM, other non-volatile and/or volatile data storage units, or a combination or sub-combination thereof. Electronic data, including data described herein, may be temporarily and/or permanently stored in storage device 806. For example, data representative of one or more executable applications 812 configured to direct processor 804 to perform any of the operations described herein may be stored within storage device 806. In some examples, data may be arranged in one or more databases residing within storage device 806.

I/O module 808 may include one or more I/O modules configured to receive user input and provide user output. One or more I/O modules may be used to receive input for a single virtual experience. I/O module 808 may include any hardware, firmware, software, or combination thereof supportive of input and output capabilities. For example, I/O module 808 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 808 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 808 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 800. For example, one or more applications 812 residing within storage device 806 may be configured to direct processor 804 to perform one or more processes or functions associated with processor 104 of system 100. Likewise, memory 102 of system 100 may be implemented by or within storage device 806.

To the extent the aforementioned embodiments collect, store, and/or employ personal information of individuals, groups, or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information may be in an appropriately secure manner reflective of the type of information, for example, through various access control, encryption, and anonymization techniques for particularly sensitive information.

In the preceding specification, various example embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The specification and drawings are accordingly to be regarded in an illustrative rather than a restrictive sense.

What is claimed is:

1. A method comprising:
   receiving, by an injection detection system, a text statement comprising a set of text elements implementing one or more instructions configured to direct a processor to perform an operation with respect to a data structure, wherein the text statement:
   is formed by populating one or more placeholders, in a template statement, with one or more insertion elements from a data client, and
   is associated with metadata that designates a target risk element count defined during a generation of the template statement to equal a number of risk elements preapproved to occur within the set of text elements of the text statement after the one or more insertion elements populate the one or more placeholders in the template statement;
   determining, by the injection detection system, a detected risk element count equal to a number of risk elements that occur within the set of text elements of the text statement;
   detecting, by the injection detection system based on the target risk element count and the detected risk element count, a violation of a predetermined rule defining an acceptable relationship between the target and detected risk element counts for the text statement; and
   triggering, by the injection detection system based on the detecting of the violation of the predetermined rule, an exception condition indicating a risk that the text statement corresponds to an injection attack on the data structure.

2. The method of claim 1, wherein the determining of the detected risk element count includes:
   accessing a first list of text elements that, if included within the set of text elements of the text statement, are to be counted as allowed elements;
   accessing a second list of text elements that, if included within the set of text elements of the text statement, are to be counted as prohibited elements;
   accessing a third list of text elements that, if included within the set of text elements of the text statement, are to be counted as risk elements; and
   determining the detected risk element count to be a number of text elements within the set that are indicated on the third list.

3. The method of claim 2, further comprising:
   restricting, by the injection detection system based on the detecting of the violation of the predetermined rule, the text statement from being provided to the processor for performing the operation with respect to the data structure;
   receiving, by the injection detection system, an additional text statement comprising an additional set of text elements implementing one or more additional instructions configured to direct the processor to perform an additional operation with respect to the data structure;
   determining, by the injection detection system, that the additional set of text elements includes a text element that is indicated on the first list; and
   providing, by the injection detection system, the additional text statement to the processor for performing the additional operation with respect to the data structure,
   wherein, based on the determining that the additional set of text elements includes the text element that is indicated on the first list, the providing of the additional text statement to the processor includes providing the text element in an unaltered form.

4. The method of claim 2, further comprising:
   restricting, by the injection detection system based on the detecting of the violation of the predetermined rule, the text statement from being provided to the processor for performing the operation with respect to the data structure;
   receiving, by the injection detection system, an additional text statement comprising an additional set of text elements implementing one or more additional instructions configured to direct the processor to perform an additional operation with respect to the data structure;
   determining, by the injection detection system, that the additional set of text elements includes a text element that is indicated on the second list; and
   restricting, by the injection detection system based on the determining that the additional set of text elements includes the text element that is indicated on the second list, the additional text statement from being provided to the processor for performing the additional operation with respect to the data structure.

5. The method of claim 2, further comprising:
   restricting, by the injection detection system based on the detecting of the violation of the predetermined rule, the text statement from being provided to the processor for performing the operation with respect to the data structure;
   receiving, by the injection detection system, an additional text statement comprising an additional set of text elements implementing one or more additional instructions configured to direct the processor to perform an additional operation with respect to the data structure;
   determining, by the injection detection system, that the additional set of text elements includes a text element that is not indicated on any of the first, second, or third lists; and
   providing, by the injection detection system, the additional text statement to the processor for performing the additional operation with respect to the data structure,
   wherein, based on the determining that the additional set of text elements includes the text element that is not indicated on any of the first, second, or third lists, the providing of the additional text statement to the processor includes providing the text element in an altered form.

6. The method of claim 1, wherein:
   the text statement is an SQL query;
   the data structure is an SQL-compliant database; and
   the one or more instructions implemented by the SQL query are configured to direct the processor to perform a database operation with respect to the SQL-compliant database.

7. The method of claim 6, wherein:
the SQL query is included among a plurality of SQL queries received by a shared client interface from a plurality of distinct data sources; and
prior to the processor being directed to perform any database operation with respect to the SQL-compliant database as directed by one or more instructions implemented by a particular SQL query of the plurality of SQL queries, a text statement analysis is performed by the injection detection system on the particular SQL query.

8. The method of claim 1, wherein:
the determining of the detected risk element count includes determining a typed count of text elements that are risk elements of a particular type;
the predetermined rule defines the acceptable relationship between the target and detected risk element counts with respect to risk elements of the particular type; and
the detecting of the violation of the predetermined rule includes detecting that the typed count of text elements that are risk elements of the particular type does not have the acceptable relationship to the target risk element count for the risk elements of the particular type.

9. The method of claim 1, wherein the predetermined rule is configured to be violated if the target and detected risk element counts are unequal.

10. The method of claim 1, wherein:
a text element analysis that provides additional injection attack security based on risks identified from analyses of individual text elements is performed by the injection detection system in connection with a text statement analysis that includes:
the receiving of the text statement,
the identifying of the target risk element count,
the determining of the detected risk element count, and
the detecting of the violation of the predetermined rule; and
the triggering of the exception condition is further based on the text element analysis.

11. A system comprising:
a memory storing instructions; and
a processor communicatively coupled to the memory and configured to execute the instructions to:
receive a text statement comprising a set of text elements implementing one or more instructions configured to direct the processor to perform an operation with respect to a data structure, wherein the text statement:
is formed by populating one or more placeholders, in a template statement, with one or more insertion elements from a data client, and
is associated with metadata that designates a target risk element count defined during a generation of the template statement to equal a number of risk elements preapproved to occur within the set of text elements of the text statement after the one or more insertion elements populate the one or more placeholders in the template statement;
determine a detected risk element count equal to a number of risk elements that occur within the set of text elements of the text statement;
detect, based on the target risk element count and the detected risk element count, a violation of a predetermined rule defining an acceptable relationship between the target and detected risk element counts for the text statement; and
trigger, based on the detecting of the violation of the predetermined rule, an exception condition indicating a risk that the text statement corresponds to an injection attack on the data structure.

12. The system of claim 11, wherein the determining of the detected risk element count includes:
accessing a first list of text elements that, if included within the set of text elements of the text statement, are to be counted as allowed elements;
accessing a second list of text elements that, if included within the set of text elements of the text statement, are to be counted as prohibited elements;
accessing a third list of text elements that, if included within the set of text elements of the text statement, are to be counted as risk elements; and
determining the detected risk element count to be a number of text elements within the set that are indicated on the third list.

13. The system of claim 12, wherein:
the processor is further configured to execute the instructions to:
restrict, based on the detecting of the violation of the predetermined rule, the text statement from being provided to the processor for performing the operation with respect to the data structure,
receive an additional text statement comprising an additional set of text elements implementing one or more additional instructions configured to direct the processor to perform an additional operation with respect to the data structure,
determine that the additional set of text elements includes a text element that is indicated on the first list, and
provide the additional text statement to the processor for performing the additional operation with respect to the data structure; and
based on the determining that the additional set of text elements includes the text element that is indicated on the first list, the providing of the additional text statement to the processor includes providing the text element in an unaltered form.

14. The system of claim 12, wherein the processor is further configured to execute the instructions to:
restrict, based on the detecting of the violation of the predetermined rule, the text statement from being provided to the processor for performing the operation with respect to the data structure;
receive an additional text statement comprising an additional set of text elements implementing one or more additional instructions configured to direct the processor to perform an additional operation with respect to the data structure;
determine that the additional set of text elements includes a text element that is indicated on the second list; and
restrict, based on the determining that the additional set of text elements includes the text element that is indicated on the second list, the additional text statement from being provided to the processor for performing the additional operation with respect to the data structure.

15. The system of claim 12, wherein:
the processor is further configured to execute the instructions to:
restrict, based on the detecting of the violation of the predetermined rule, the text statement from being provided to the processor for performing the operation with respect to the data structure, receive an additional text statement comprising an additional set of text elements implementing one or more additional instructions configured to direct the processor to perform an additional operation with respect to the data structure, determine that the additional set of text elements includes a text element that is not indicated on any of the first, second, or third lists, and provide the additional text statement to the processor for performing the additional operation with respect to the data structure; and based on the determining that the additional set of text elements includes the text element that is not indicated on any of the first, second, or third lists, the providing of the additional text statement to the processor includes providing the text element in an altered form.

16. The system of claim 11, wherein:

the text statement is an SQL query;

the data structure is an SQL-compliant database; and the one or more instructions implemented by the SQL query are configured to direct the processor to perform a database operation with respect to the SQL-compliant database.

17. The system of claim 16, wherein:

the SQL query is included among a plurality of SQL queries received by a shared client interface from a plurality of distinct data sources;

the predetermined rule is configured to be violated if the target and detected risk element counts are unequal; and prior to the processor being directed to perform any database operation with respect to the SQL-compliant database as directed by one or more instructions implemented by a particular SQL query of the plurality of SQL queries, a text statement analysis is performed by the system on the particular SQL query.

18. The system of claim 11, wherein:

the determining of the detected risk element count includes determining a typed count of text elements that are risk elements of a particular type;

the predetermined rule defines the acceptable relationship between the target and detected risk element counts with respect to risk elements of the particular type; and the detecting of the violation of the predetermined rule includes detecting that the typed count of text elements that are risk elements of the particular type does not have the acceptable relationship to the target risk element count for the risk elements of the particular type.

19. The system of claim 11, wherein:

a text element analysis that provides additional injection attack security based on risks identified from analyses of individual text elements is performed by the system in connection with a text statement analysis that includes:

the receiving of the text statement, the identifying of the target risk element count, the determining of the detected risk element count, and the detecting of the violation of the predetermined rule; and the triggering of the exception condition is further based on the text element analysis.

20. A non-transitory computer-readable medium storing instructions that, when executed, direct a processor of a computing device to:

receive a text statement comprising a set of text elements implementing one or more instructions configured to direct the processor to perform an operation with respect to a data structure, wherein the text statement:

is formed by populating one or more placeholders, in a template statement, with one or more insertion elements from a data client, and is associated with metadata that designates a target risk element count defined during a generation of the template statement to equal a number of risk elements preapproved to occur within the set of text elements of the text statement after the one or more insertion elements populate the one or more placeholders in the template statement;

determine a detected risk element count equal to a number of risk elements that occur within the set of text elements of the text statement;

detect, based on the target risk element count and the detected risk element count, a violation of a predetermined rule defining an acceptable relationship between the target and detected risk element counts for the text statement; and trigger, based on the detecting of the violation of the predetermined rule, an exception condition indicating a risk that the text statement corresponds to an injection attack on the data structure.

* * * * *